United States Patent [19]

Bedell et al.

[11] Patent Number: 4,632,912

[45] Date of Patent: Dec. 30, 1986

[54] POLYMER SUPPORTED ZIEGLER-NATTA CATALYSTS

[75] Inventors: Stephen A. Bedell, Lake Jackson, Tex.; William R. Howell, Jr., Midland, Mich.; William M. Coleman, III, Lake Jackson, Tex.

[73] Assignee: The Dow Chemical Company, Midland, Mich.

[21] Appl. No.: 807,419

[22] Filed: Dec. 10, 1985

[51] Int. Cl.$^4$ .................. C08F 4/62; C08F 4/64; C08F 4/68

[52] U.S. Cl. .................. 502/122; 502/109; 502/117; 502/124; 502/125; 502/159; 526/140; 526/141; 526/142; 526/143

[58] Field of Search ............ 502/102, 109, 117, 122, 502/124, 125, 159

[56] References Cited

U.S. PATENT DOCUMENTS

| | | | |
|---|---|---|---|
| 3,396,155 | 8/1968 | Delbouille et al. | 260/80.78 |
| 3,412,174 | 11/1968 | Kroll | 502/117 X |
| 3,642,760 | 2/1972 | Backelmans et al. | 260/94.3 |
| 4,098,979 | 7/1978 | Maemoto et al. | 526/100 |
| 4,147,664 | 4/1979 | Pomogailo et al. | 502/125 X |
| 4,161,462 | 7/1979 | Bocharov et al. | 502/109 |
| 4,290,918 | 9/1981 | Bayer et al. | 502/159 |
| 4,452,914 | 6/1984 | Coleman, III et al. | 502/122 |
| 4,525,556 | 6/1985 | Coleman, III et al. | 526/125 |
| 4,528,339 | 7/1985 | Coleman, III et al. | 526/127 |

OTHER PUBLICATIONS

*J. Macromol. Sci. Chem.*, A11(3), pp. 633–642 (1977) by Suzuki et al, entitled "Polymerization of Olefins by a Ziegler Catalyst Supported on Poly(ethylene–co–Vinyl Alcohol)".

*Primary Examiner*—Patrick P. Garvin
*Attorney, Agent, or Firm*—James G. Carter

[57] ABSTRACT

Ziegler-Natta catalysts which are polymer supported compounds or complexes of elements of the d-block transition metals, lanthanide or actinide series are disclosed. An example of the polymer support is chloromethylated polystyrene-divinyl benzene copolymer covalently bonded to catechol. An example of the compound or complex of an element of the transition metal, lanthanide or actinide series is that which results when catechol which is covalently bonded to the polymer is contacted with titanium tetraisopropoxide. These catalysts are useful in preparing polymers with reduced halide content which reduces corrosion in polymer processing equipment.

4 Claims, No Drawings

POLYMER SUPPORTED ZIEGLER-NATTA CATALYSTS

BACKGROUND OF THE INVENTION

The present invention concerns polymer supported Ziegler-Natta catalysts and the polymerization of olefins in the presence of such catalysts.

U.S. Pat. Nos. 4,452,914, 4,525,556 and 4,528,339 disclose Ziegler-Natta catalysts prepared from compounds or complexes formed by contacting a titanium halide or a titanium alkoxide with a polyhydric organic compound for polymerizing olefins. The catalysts are supported on magnesium halide supports which can cause corrosion problems in polymer processing equipment.

The catalysts of the present invention are supported on polymers which tend to reduce or eliminate the corrosion problems associated with the magnesium halide supported catalysts.

SUMMARY OF THE INVENTION

The present invention pertains to a polymer supported Ziegler-Natta catalyst resulting from contacting for a time sufficient to form a compound or a complex
(A) at least one organic polymeric material to which has been covalently bonded one or more dihydric phenolic compounds; with
(B) at least one compound of an element from the d-block transition metals, lanthanide or actinide series represented by the formula $Tm(OR)_x X_{y-x}$ wherein each R is independently a hydrocarbyl group having from 1 to about 20, preferably from about 1 to about 10, most preferably from about 2 to about 4 carbon atoms; Tm is an element from the d-block transition metals, lanthanide or actinide series; X is a halogen; x has a value from zero to a value equal to the valence of the element Tm and y has a value equal to the valence of the element Tm.

The present invention also pertains to a process for polymerizing one or more α-olefins in the presence of the aforementioned Ziegler-Natta catalyst.

DETAILED DESCRIPTION OF THE INVENTION

The catalyst of the present invention can be conveniently prepared by contacting the organic polymeric material containing the covalently bonded aromatic polyhydric compound and the titanium compound in a suitable solvent for a time sufficient to complete the reaction. The temperature employed can be from about 0° C. to about 100° C., preferably from about 10° C. to about 50° C., most preferably from about 20° C. to about 30° C. The time, of course, depends upon the temperature, but the time employed is that which is required to complete the reaction. The polymeric material and the titanium compound are usually employed in an amount which provides a ratio of the number of moles of aromatic polyhydric compound to atoms of titanium of from about 1:1 to about 10:1, preferably from about 1:1 to about 5:1, most preferably from about 1:1 to about 3:1.

The organic halogen-containing polymeric materials containing the covalently bonded aromatic polyhydric compounds which can be employed herein can be prepared by reacting an organic polymer containing carbon-halogen bonds with an aromatic polyhydric compound, in a solvent, in the presence of a Friedel-Crafts type catalyst at a temperature of from about 0° C. up to the boiling point of the solvent at the pressure employed, preferably from about 10° C. to about 150° C., most preferably from about 90° C. to about 120° C. The time, of course, depends upon the temperature, but is that which is required to react all of the halogen atoms contained in the polymer. The resultant product is then removed from the solvent prior to reacting with the compound of an element of the d-block transition metals, lanthanide or actinide series. This removal can be accomplished by decantation, filtration, centrifugation or the like. The amount of halogen-containing polymer and aromatic polyhydric compound depends upon the amount of titanium compound desired to be added, but an amount of aromatic polyhydric compound sufficient to react with all of the halogen atoms in the polymer is employed up to a ratio of aromatic polyhydric compound to halogen atom ratio of about 30:1, preferably from about 1:1 to about 10:1, most preferably from about 1:1 to about 3:1 is employed.

Suitable organic polymeric materials which can be employed herein include, for example, chloromethylated polystyrene, chloromethylated styrene/divinyl benzene copolymers, chlorinated polyethylene, polyvinyl chloride, bromomethylated polystyrene, combinations thereof and the like.

Suitable polyhydric aromatic compounds which can be employed herein include those represented by the following formulas I-IX:

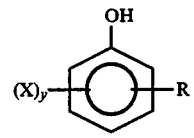

I.

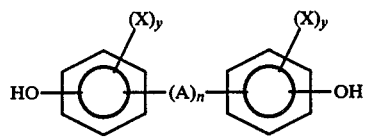

II.

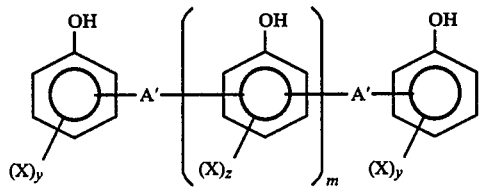

III.

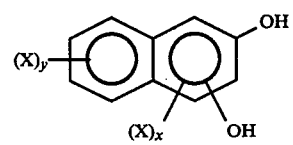

IV.

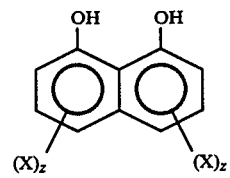

V.

-continued

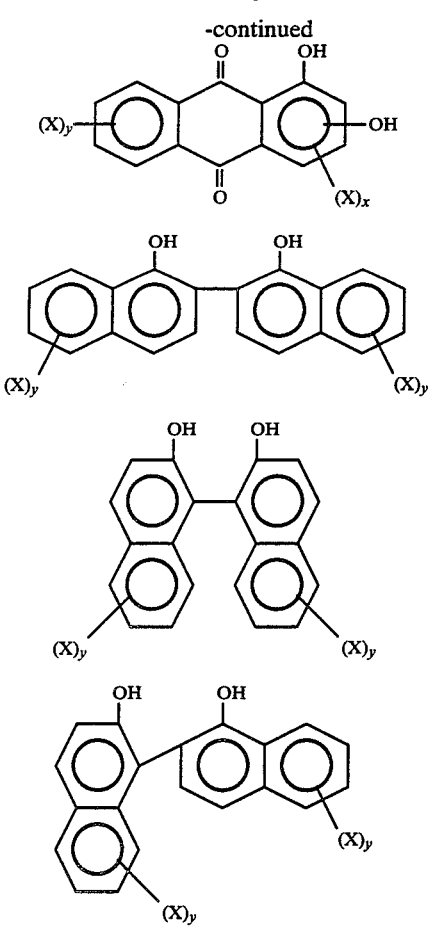

wherein each A is independently a divalent hydrocarbyl group having from 1 to about 10, preferably from about 1 to about 4 carbon atoms, —O—, —S—, —S—S—,

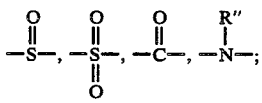

each A' is independently a divalent hydrocarbyl group have from 1 to about 10, preferably from 1 to about 4 carbon atoms; each R is independently

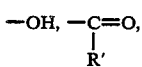

or a hydroxyl substituted hydrocarbyl or a hydroxyl substituted hydrocarbyloxy group having from 1 to about 20, preferably from 1 to about 10 carbon atoms; each R' is independently hydrogen, hydroxyl or a hydrocarbyl or hydrocarbyloxy group having from 1 to about 10, preferably from 1 to about 6 carbon atoms; each R" is independently hydrogen or a hydrocarbyl or hydrocarbyloxy group having from 1 to about 10, preferably from 1 to about 6 carbon atoms; each X is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20, preferably from 1 to about 12 carbon atoms or a halogen; m has an average value of from about 0.01 to about 6, preferably from about 1 to about 3; each n independently has a value of zero or 1; n' has a value of 3; each x independently has a value of from zero to 2; each y independently has a value of from zero to 4, preferably from 1 to 2 and z has a value of from zero to 3, preferably from 1 to 2.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

Particularly suitable polyhydric aromatic compounds which can be employed herein include, for example, catechol, resorcinol, bisphenol A, 4-t-butylcatechol, bis(hydroxyphenyl)methane, 4-t-octylcatechol, 3-isopropylcatechol, 3-isopropyl-6-methylcatechol, 3,5-dibutylcatechol, 3-methoxycatechol, o,o'-biphenol 2,3-dihydroxy naphthalene, salicylaldehyde, o-hydroxy benzophenone, 3,4-dihydroxy benzaldehyde, mixtures thereof and the like.

Suitable Friedel-Crafts catalysts which can be employed herein include, for example, zinc dichloride, aluminum trichloride, stannic chloride, amalgamated aluminum, boron trifluoride, beryllium chloride, combinations thereof and the like.

Suitable compounds of the elements of the d-block transition metals, lanthanide or actinide series include compounds of titanium, vanadium, zirconium neodymium, erbium, thorium, lutetium and uranium.

Particularly suitable compounds of the elements of the transition metal, lanthanide or actinide series which can be employed herein include, for example, tetraethoxy titanium, tetra-n-propoxy titanium, tetraisopropoxy titanium, tetra-n-butoxy titanium, tetraphenoxy titanium, tetra-(2-ethylhexoxy)titanium, di-n-butoxy titanium dichloride, titanium tetrachloride, bis-cyclopentadienyltitanium dichloride, zirconium tetrachloride, bis-cyclopentadienylzirconium dichloride, vanadium tetrachloride, vanadium oxytrichloride, bis-cyclopentadienyluraniumdimethyl, bis-cyclopentadienylneodymium hydride, mixtures thereof and the like.

Suitable solvents or inert diluents in which the catalyst can be prepared include, for example, aliphatic, cycloaliphatic and aromatic hydrocarbons, mixtures thereof and the like. Particularly suitable such solvents or inert diluents include, for example, liquified ethane, propane, isobutane, n-butane, n-hexane, the various isomeric hexanes, isooctane, paraffinic mixtures of alkanes having from about 8 to about 12 carbon atoms, cyclohexane, methylcyclopentane, dimethylcyclohexane, dodecane, industrial solvents composed of saturated or aromatic hydrocarbons such as kerosene, naphthas, etc., especially when free of any olefin compounds and other impurities, and especially those having boiling points or ranges in the range of from about −50° C. to about 200° C. Also, included as a suitable solvent or inert diluents are benzene, toluene, ethylbenzene, cumene, decalin and the like. Mixtures of any of the solvents or inert diluents are also suitable.

Mixing of the catalyst components is advantageously carried out under an inert atmosphere such as, for example, nitrogen, xenon, argon or other inert gas at the temperatures employed.

An organoaluminum cocatalyst is employed with the titanium catalysts of the present invention in the polymerization of one or more α-olefins. Suitable such aluminum compounds include those represented by the formula $AlR_{3-x}X_x$ wherein R is a hydrocarbyl group having from 1 to about 4 carbon atoms; X is a halogen and x has a value of zero to 2. Particularly suitable cocatalysts include, for example, triethylaluminum, tripropylaluminum, triisobutylaluminum, ethyl aluminum dichloride, diethyl aluminum chloride, mixtures thereof and the like.

The cocatalyst can be premixed with the titanium catalysts of the present invention before addition to the polymerization zone or the catalyst and the cocatalyst can be added to the polymerization zone in separate streams.

Suitable α-olefins which can be polymerized with the catalysts of the present invention include, for example, those having from 2 to about 20, particularly those having from 2 to about 10, carbon atoms. Particularly suitable α-olefins include, for example, ethylene, propylene, butene-1, pentene-1, hexene-1, heptene-1, octene-1, nonene-1, decene-1, 4-methyl-1-pentene, mixtures thereof and the like.

The α-olefins can also be copolymerized with any polymerizable ethylenically unsaturated monomer such as, for example, dienes, ethylenically unsaturated carboxylic acids, ethylenically unsaturated carboxylic acid esters, ethylenically unsaturated aromatic compounds, nitriles and the like. Particularly such comonomers include, for example, butadiene, styrene, vinyl toluene, chloromethyl styrene, α-methyl styrene, acrylic acid, methacrylic acid, methyl acrylate, methyl methacrylate, ethyl acrylate, ethyl methacrylate, 2-ethyl hexyl acrylate, 2-ethyl hexyl methacrylate, acrylonitrile, methacrylonitrile, mixtures thereof and the like.

In the polymerization process employing the aforementioned catalysts, polymerization is effected by adding a catalytic amount of the titanium catalyst and any cocatalyst to a polymerization zone containing an α-olefin monomer or mixture of polymerizable monomers, or vice versa. Any polymerization method can be employed including slurry, solution, gas phase, high pressure processes, and the like. The polymerization zone is usually maintained at temperatures in the range of from about 0° C. to about 300° C., preferably from at solution polymerization temperatures, e.g., from about 130° C. to about 250° C., for a residence time of about a few seconds to several days, preferably 15 seconds to 2 hours (7200 s). It is generally desirable to carry out the polymerization in the absence of moisture and oxygen and a catalytic amount of the catalytic reaction product is generally within the range of from about 0.0001 to about 0.1 millimoles of titanium per liter of diluent.

It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the catalyst of the present invention, care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitable as defined hereinbefore for use in the preparation of the catalyst.

The polymerization pressures preferably employed are relatively low, e.g., from about 5 to about 10,000 psig (0.034–68.9 MPa), preferably from about 50 to about 1000 psig (0.345–6.89 MPa), most preferably from about 100 to about 700 psig (0.689–4.8 MPa). However, polymerization within the scope of the present invention can occur at pressures from atmospheric up to pressures determined by the capabilities of the polymerization equipment, which can include pressures up to about 50,000 psig (344.5 MPa). During polymerization it is desirable to stir the polymerization recipe to obtain better temperature control and to maintain uniform polymerization mixtures throughout the polymerization zone.

In order to optimize catalyst yields in the polymerization of ethylene under solution conditions, it is preferable to maintain a monomer concentration in the solvent in the range of from about 1 to about 10 weight percent, most advantageously from about 1.2 to about 2 weight percent. To achieve this, when an excess of monomer is fed into the system, a portion of the monomer can be vented. In other processes, it is preferred to conduct the polymerization in an excess of the α-olefin being polymerized in order to optimize catalyst yields.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence of absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue.

The following example is given to illustrate the invention, and should not be construed as limiting its scope. All percentages are by weight and all parts are by molar or atomic ratio unless otherwise indicated. In the following example, the melt index values $I_2$ and $I_{10}$ were determined by ASTM D 1238-80 and the density values were determined by ASTM D 1248.

EXAMPLE

Part A. Preparation of Halogenated Polymer

A suspension of divinylbenzene/styrene (3%/97% by weight) copolymer in water having an average particle size of 4.3 microns was filtered and dried. This dried polymer, 5 g, was chloromethylated with 25 ml of chloromethyl methyl ether in the presence of 1 ml of $SnCl_4$. The resultant chlorinated polymer contained 19.5 percent chlorine by weight.

Part B. Preparation of Catalyst Support

The halogenated polymer from A above (7 g) was reacted with 10 g of catechol in 100 ml of p-dioxane employing 1 ml of $SnCl_4$ as a catalyst. The catalyst support was removed from the solvent by filtration. The resultant catalyst support contained 3.1 milliequivalents of catechol/g.

Part C. Preparation of Catalyst

An equivalent amount (0.417 g) of tetraisopropoxy titanium was added to 0.478 g of the support prepared in A above and 50 ml of Isopar ® E solvent and reacted at 25° C. for 16 hours (57,600 s) thereby producing the catalyst complex.

Part D. Polymerization

The polymerization was conducted in a stirred, 1 gallon (3.79 l) batch reactor containing 2 liters of Isopar ® E which was heated to the reaction temperature and the solvent vapor pressure recorded. To this reactor containing the catalyst and cocatalyst was added an amount of hydrogen and the monomer(s) to be polymerized. The catalyst, cocatalyst, monomer(s), reaction conditions and results are given in the following Table.

| Component | Run A | Run B |
|---|---|---|
| monomer(s) | ethylene | ethylene |
| catalyst | Part C | Part C |
| millimoles of Ti | 0.009 | 0.009 |
| cocatalyst | triethyl aluminum | triethyl aluminum |
| millimoles of Al | 0.036 | 0.036 |
| solvent pressure | | |
| psig | 65 | 45 |
| kPa | 448 | 310 |
| hydrogen pressure | | |
| psig | 5 | 5 |
| kPa | 34 | 34 |
| monomer(s) pressure | | |
| psig | 380 | 400 |
| kPa | 2620 | 2758 |
| reaction temperature, °C. | 195 | 175 |
| reaction time | | |
| minutes | 15 | 15 |
| seconds | 900 | 900 |
| polymer produced, grams | 8.3 | 13.1 |
| catalyst efficiency g polymer/g Ti | 19,000 | 30,000 |

We claim:

1. A polymer supported Ziegler-Natta catalyst resulting from contacting for a time sufficient to form a compound or a complex
   (A) (1) at least one organic polymeric material to which has been covalently bonded (2) one or more dihydric phenolic compounds; which has been prepared by reacting a halogenated organic polymeric material with said dihydric phenolic compound; with
   (B) at least one compound of an element from the transition metal, lanthanide or actinide series represented by the formula $Tm(OR)_xX_{y-x}$ wherein each R is independently a hydrocarbyl group having from 1 to about 20 carbon atoms; Tm is an element from the transition metal, lanthanide or actinide series; X is a halogen; x has a value from zero to a value equal to the valence of the element Tm and y has a value equal to the valence of the element Tm; and
   wherein components (A-1) and (A-2) are employed in amounts which provides a ratio of moles of (A-2) per halogen atom contained in a halogenated component (A-1) of from about 1:1 to about 30:1 and components (A) and (B) are employed in an amount which provides a ratio of moles of polyhydric aromatic compound per atom of Tm of from about 1:1 to about 10:1.

2. A catalyst of claim 1 wherein
   (i) the dihydric phenolic compound is represented by the formulas (I-IX) in the specification wherein each A is independently a divalent hydrocarbyl group having from 1 to about 10 carbon atoms, —O—, —S—, —S—S—,

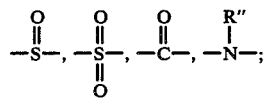

each A' is independently a divalent hydrocarbyl group having from 1 to about 10 carbon atoms; each R is independently

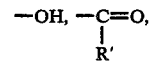

or a hydroxyl substituted hydrocarbyl or a hydroxyl substituted hydrocarbyloxy group having from 1 to about 20 carbon atoms; each R' is independently hydrogen, hydroxyl or a hydrocarbyl or hydrocarbyloxy group having from 1 to about 10 carbon atoms; each R" is independently hydrogen or a hydrocarbyl or hydrocarbyloxy group having from 1 to about 10; each X is independently a hydroxyl group, a nitro group, a nitrile group, a hydrocarbyl group, a hydrocarbyloxy group, a hydroxyl substituted hydrocarbyl or a hydroxyl substituted hydrocarbyloxy group each such groups having from 1 to about 20 carbon atoms or a halogen; m has an average value of from about 0.01 to about 6; each n independently has a value of zero or 1; n' has a value of 3; each x independently has a value of from zero to 2; each y independently has a value of from zero to 4 and z has a value of from zero to 3;

(ii) in component (B), Tm is Ti, Zr or V;

(iii) components (A-1) and (A-2) are employed in an amount which provides a ratio of moles of (A-2) per halogen atom contained in halogenated component (A-1) of from about 1:1 to about 10:1; and (iv) components (A) and (B) are employed in an amount which provides a ratio of moles of polyhydric aromatic compound per atom of titanium of from about 1:1 to about 5:1.

3. A catalyst of claim 2 wherein (i) the dihydric phenolic compound is represented by formula I in the specification wherein each R is a hydroxyl group; each X is independently hydrogen or a hydrocarbyl group having from 1 to about 6 carbon atoms and y has a value of 1;

(ii) in component (B), Tm is titanium;

(iii) components (A-1) and (A-2) are employed in an amount which provides a ratio of moles of (A-2) per halogen atom contained in halogenated component (A-1) of from about 1:1 to about 3:1; and (iv) components (A) and (B) are employed in an amount which provides a ratio of moles of polyhydric aromatic compound per atom of titanium of from about 1:1 to about 3:1.

4. A catalyst of claim 3 wherein (i) component (A-1) is chloromethylated polystyrene, chloromethylated styrene/divinylbenzene copolymer or a combination thereof;

(ii) component (A-2) is catechol, 4-t-butyl catechol or a combination thereof; and (iii) component (B) is tetraisopropoxy titanium, titanium tetrachloride or a combination thereof.

* * * * *